United States Patent
Tu et al.

(10) Patent No.: US 9,841,821 B2
(45) Date of Patent: Dec. 12, 2017

(54) METHODS FOR AUTOMATICALLY ASSESSING USER HANDEDNESS IN COMPUTER SYSTEMS AND THE UTILIZATION OF SUCH INFORMATION

(71) Applicant: zSpace, Inc., Sunnyvale, CA (US)

(72) Inventors: Jerome C. Tu, Saratoga, CA (US); Carola F. Thompson, Mountain View, CA (US); Mark F. Flynn, San Jose, CA (US); Douglas C. Twilleager, Campbell, CA (US); David A. Chavez, San Jose, CA (US); Kevin D. Morishige, Los Altos Hills, CA (US); Peter F. Ullmann, San Jose, CA (US); Arthur L. Berman, San Jose, CA (US)

(73) Assignee: zSpace, Inc., Sunnyvale, CA (US)

( * ) Notice: Subject to any disclaimer, the term of this patent is extended or adjusted under 35 U.S.C. 154(b) by 0 days.

(21) Appl. No.: 14/072,933

(22) Filed: Nov. 6, 2013

(65) Prior Publication Data

US 2015/0123891 A1 May 7, 2015

(51) Int. Cl.
*G06F 3/01* (2006.01)

(52) U.S. Cl.
CPC .............. *G06F 3/017* (2013.01); *G06F 3/012* (2013.01)

(58) Field of Classification Search
CPC ................. G06F 3/01; G06F 2203/013; G06F 2203/014; G06F 2203/015; G06F 3/011;
(Continued)

(56) References Cited

U.S. PATENT DOCUMENTS 7,345,684 B2 * 3/2008 Gardos .......................... 345/204
8,330,733 B2 * 12/2012 Petschnigg ........... G06F 1/1647
345/173
(Continued)

FOREIGN PATENT DOCUMENTS

EP       1255187 A2    6/2002
WO   WO 0054247 A1    9/2000

OTHER PUBLICATIONS

Kurtenbach, Gordon, George Fitzmaurice, Thomas Baudel, and Bill Buxton, "The Design of a GUI Paradigm Based on Tablets, Two-hands, and Transparency," Proceedings of the ACM Symposium on User Interface Software and Technology (UIST'03), 2003 (8 pages).

*Primary Examiner* — Grant Sitta
(74) *Attorney, Agent, or Firm* — Meyertons Hood Kivlin Kowert & Goetzel, P.C.; Jeffrey C. Hood; Brian E. Moore (57) ABSTRACT

In some embodiments, a system and/or method may assess handedness of a user of a system in an automated manner. The method may include displaying a 3D image on a display. The 3D image may include at least one object. The method may include tracking a position and an orientation of an input device in open space in relation to the 3D image. The method may include assessing a handedness of a user based on the position and the orientation of the input device with respect to at least one of the objects. In some embodiments, the method may include configuring at least a portion of the 3D image based upon the assessed handedness. The at least a portion of the 3D image may include interactive menus. In some embodiments, the method may include configuring at least a portion of an interactive hardware associated with the system based upon the assessed handedness.

26 Claims, 6 Drawing Sheets

(58) Field of Classification Search
CPC .......... G06F 3/012; G06F 3/013; G06F 3/014; G06F 3/016; G06F 3/0416; G06F 3/0418; G06F 345/156
USPC ..... 345/156–175; 178/18.01–18.06; 715/700
See application file for complete search history.

(56) References Cited

U.S. PATENT DOCUMENTS

| | | | |
|---|---|---|---|
| 8,696,458 B2 * | 4/2014 | Foxlin | G07F 17/3209 345/156 |
| 2007/0236460 A1 | 10/2007 | Young | |
| 2009/0048001 A1 * | 2/2009 | Mihara et al. | 455/566 |
| 2009/0167702 A1 * | 7/2009 | Nurmi | 345/173 |
| 2009/0209343 A1 * | 8/2009 | Foxlin | G07F 17/3209 463/36 |
| 2010/0095206 A1 * | 4/2010 | Kim | 715/702 |
| 2011/0169760 A1 * | 7/2011 | Largillier | G06F 3/04883 345/173 |
| 2011/0187706 A1 * | 8/2011 | Vesely et al. | 345/419 |
| 2012/0005624 A1 * | 1/2012 | Vesely | 715/808 |
| 2012/0013613 A1 * | 1/2012 | Vesely | 345/419 |
| 2012/0131516 A1 * | 5/2012 | Chiu | G06F 3/04883 715/863 |
| 2012/0158629 A1 * | 6/2012 | Hinckley et al. | 706/15 |
| 2012/0162384 A1 * | 6/2012 | Vesely et al. | 348/47 |
| 2013/0057540 A1 * | 3/2013 | Winnemoeller et al. | 345/419 |
| 2013/0093708 A1 * | 4/2013 | Annett | G06F 3/041 345/173 |
| 2013/0106782 A1 * | 5/2013 | Nowatzyk et al. | 345/175 |
| 2013/0181892 A1 * | 7/2013 | Liimatainen et al. | 345/156 |
| 2014/0104189 A1 * | 4/2014 | Marshall | G06F 3/0416 345/173 |
| 2014/0104274 A1 * | 4/2014 | Hilliges et al. | 345/424 |
| 2014/0168077 A1 * | 6/2014 | Hicks | G06F 3/04883 345/157 |
| 2014/0184519 A1 | 7/2014 | Benchenaa | |
| 2014/0282269 A1 * | 9/2014 | Strutt et al. | 715/863 |
| 2014/0354689 A1 * | 12/2014 | Lee | A61B 1/00045 345/633 |

\* cited by examiner

METHODS FOR AUTOMATICALLY ASSESSING USER HANDEDNESS IN COMPUTER SYSTEMS AND THE UTILIZATION OF SUCH INFORMATION

BACKGROUND OF THE INVENTION

1. Field of the Invention

The present disclosure generally relates to tracking. More particularly, the disclosure generally relates to systems and methods for automatically assessing a handedness of a user by tracking one or more portions of a user and/or an input device manipulated by a user. The system may automatically optimize relevant aspects of input device functionality and/or the user interface of a computer system.

2. Description of the Relevant Art

Three dimensional (3D) capable electronics and computing hardware devices and real-time computer-generated 3D computer graphics have been a popular area of computer science for the past few decades, with innovations in visual, audio, tactile and biofeedback systems. Much of the research in this area has produced hardware and software products that are specifically designed to generate greater realism and more natural computer-human interfaces. These innovations have significantly enhanced and simplified the end-user's computing experience.

The designs of several computer input devices (e.g., mice) are optimized for the use by and convenience of the ~90% of the population that is right handed. To some extent, the same is also true of layout and functionality of User Interfaces (UIs). One consequence of such assumptions is that the ~10% of the population that is left handed may find it inconvenient or difficult to use said input devices and/or UIs.

An alternative and perhaps a more descriptively accurate way to describe the handedness situation is to observe that people have a dominant hand and a non-dominant hand. The dominant hand is generally more capable of accurate movement and, thus, more capable of precise control of input tools and in the utilization of the UI. It follows, therefore, that the dominant hand will be used for most input and interaction functions while the non-dominant hand will be utilized primarily in "support" roles.

Separate from the issue of precision are the related issues of user convenience and efficiency. The optimum (or at least desired) arrangement and location of objects in 3D space and/or UI elements can be different for right and left handed users.

In a 3D computer, the user interacts with virtual objects in a volume projected in an area around (e.g., behind, in front, below, etc.) the screen using a 3D input device (pointer, tool, or other device). Manipulation of objects in 3D can be direct; the user points to and selects the desired object directly in the 3D volume using hand, pointer, stylus, etc. If the input device is also in the display volume, then it's possible for the user input device to obscure the user's view of the object being manipulated. In addition, user fatigue is manifested differently in 3D direct interaction mode. If menu items, selectors, or other objects are placed far from the user input device (hand, stylus, pointer, etc.) then the user may have to move the hand or other input device a significant distance before reaching the desired object (as opposed to 2D computer usage where a user is resting their hand on a desk on a mouse). Objects may be positioned in awkward positions relative to the user, especially depending upon the user and the user's dominant hand, decreasing the user's efficiency.

A specific example of this is as follows: the combination of the hand utilized by the user to manipulate objects in 3D space, the user head position and the user view direction can together determine which if any objects or content in 3D space are visible to the user and which are obscured. Such problems lead to inefficiencies when interacting with objects in the display.

It is, therefore, desirable for the handedness of the user to be known to the computer system and for appropriate adjustments to be offered (or automatically made) to the functions of the input devices and the UI. One example offered just to illustrate this point is to place the most frequently used tools in a position that is easily accessed by the dominant hand and to do so in a position that avoids occlusion.

The handedness of the user can, of course, be determined when use of the computer system is first initiated. In prior art systems, this is often accomplished by programming the computer system to ask the user to input their handedness. It should be noted, though, that a different user may use the computer after the computer system has been turned on. In a conventional computer system, the change in users (let alone their handedness) would not be detected. It follows that a handedness identification method based on first use of the computer system is insufficient since it requires that the new user know to input their handedness without a prompt.

A more desirable approach would be for the computer system to have means to automatically determine user handedness.

Once the handedness of the user has been determined, it then becomes possible for the computer to make desirable adjustments to the functioning of the input devices and the details of the UI. The nature and purpose of any such changes is to optimize the convenience and utility of the system to the handedness of the user.

Therefore a system and/or method which results in automatically assessed the handedness of a user would be highly desirable. A system and/or method which uses the assessed handedness to make adjustments to the functionality of the input devices and the UI would be highly desirable.

SUMMARY

In some embodiments, a system and/or method may assess handedness of a user of a system in an automated manner. The method may include displaying a 3D image on a display. The 3D image may include at least one object. The method may include tracking a position and an orientation of an input device in open space in relation to the 3D image. The method may include assessing a handedness of a user based on the position and the orientation of the input device with respect to at least one of the objects. In some embodiments, the method may include configuring at least a portion of the 3D image based upon the assessed handedness. At least a portion of the 3D image may include interactive menus. In some embodiments, the method may include configuring at least a portion of an interactive hardware associated with the system based upon the assessed handedness.

BRIEF DESCRIPTION OF THE DRAWINGS

Advantages of the present invention may become apparent to those skilled in the art with the benefit of the following detailed description of the preferred embodiments and upon reference to the accompanying drawings.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

\*\*\*

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third die electrically connected to the module substrate" does not preclude scenarios in which a "fourth die electrically connected to the module substrate" is connected prior to the third die, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

It is to be understood the present invention is not limited to particular devices or biological systems, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Thus, for example, reference to "a linker" includes one or more linkers.

DETAILED DESCRIPTION

Definitions

Unless defined otherwise, all technical and scientific terms used herein have the same meaning as commonly understood by one of ordinary skill in the art.

The term "6 Degree-of-freedom" (6DOF) as used herein generally refers to three coordinates of position (x, y, z) and three coordinates of orientation (yaw, pitch, roll) that are measured and/or reported for any tracked target or object.

The term "connected" as used herein generally refers to pieces which may be joined or linked together.

The term "coupled" as used herein generally refers to pieces which may be used operatively with each other, or joined or linked together, with or without one or more intervening members.

The term "directly" as used herein generally refers to one structure in physical contact with another structure, or, when used in reference to a procedure, means that one process effects another process or structure without the involvement of an intermediate step or component.

The term "eyepoint" as used herein generally refers to the physical viewpoint of a single eye or a pair of eyes. A viewpoint above may correspond to the eyepoint of a person. For example, a person's eyepoint in the physical space has a corresponding viewpoint in the virtual space.

The term "head tracking" as used herein generally refers to tracking the position/orientation of the head in a volume. This allows the user to "look around" a virtual reality environment simply by moving the head without the need for a separate controller to change the angle of the imagery.

The term "position/orientation" as used herein generally refers to a position, but may be understood to mean position/orientation in at least 2 degrees of freedom (e.g., one dimension position and one dimension orientation . . . X, rotation). Position/orientation may be relative or absolute, as desired. Position/orientation may also include yaw, pitch, and roll information, e.g., when defining the orientation of a viewpoint.

The term "referenced" as used herein generally refers to a known and/or calculated (e.g., to a processor) precise position/orientation relation of a first object(s) (e.g., a sensor) to a second object(s) (e.g., a display device). The relationship, in some embodiments, may be predetermined in that the relationship is fixed (e.g. physically fixed as in using precision spatial mounts) such that the relationship is not adjustable after initial assembly (e.g., wherein the first object and the second object are assembled together as part of a single device). The relationship, in some embodiments, may be determined, during use, through a process (e.g., an initialization process, which may include a calibration and/or measurement process) which determines a precise spatial position/orientation relation of the first object(s) (e.g., a sensor) to the second object(s) (e.g., a display device).

The term "viewpoint" as used herein generally has the full extent of its ordinary meaning in the field of computer graphics/cameras. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint. The term "virtual viewpoint" refers to a viewpoint from within a virtual representation or 3D scene.

It is desirable to design the application to place UI objects (e.g., menus, selectors, tools, palettes, inspectors, toolbars, etc.) to mitigate user fatigue. To do so effectively, it is desirable to determine which hand (left or right) is being used to manipulate the input device. Arrangement and location of objects in 3D volume can be different for left and right handed users.

It is desirable to determine which hand is the dominant hand versus the non-dominant hand. The application software can therefore assign to the dominant hand actions that require more accuracy and precision, while the non-dominant hand can perform the more "gross" motor actions in a "support" role. (See "Asymmetric Division of Labor in Human Skilled Bimanual Action: The Kinematic Chain as a Model" by Yves Guiard which is incorporated by reference herein).

In some embodiments, a system and/or method may assess handedness of a user of a system in an automated manner. The method may include displaying a 3D image on a display. In some embodiments, said displaying the 3D image comprises providing a stereoscopic image. In some embodiments, the display may be an obliquely positioned display.

The 3D image may include at least one object. The details of how the computer system determines the handedness of the user may depend on the capabilities of the computer system. The method may include tracking a position and an orientation of an input device in open space in relation to the 3D image. The method may include assessing a handedness of a user based on the position and the orientation of the input device with respect to at least one of the objects.

For further descriptions of a stereo display head/eye tracking system, that enables the display to convey a scene or image (in mono or stereo) based on the real time position/orientation (and changing position/orientation) may be found in U.S. patent application Ser. No. 13/679,630 entitled "HEAD TRACKING EYEWEAR SYSTEM" filed Nov. 16, 2012, U.S. patent application Ser. No. 11/141,649 entitled "MULTI-PLANE HORIZONTAL PERSPECTIVE DISPLAY" filed May 31, 2005, U.S. patent application Ser. No. 12/797,958 entitled "PRESENTING A VIEW WITHIN A THREE DIMENSIONAL SCENE" filed Jun. 10, 2010, U.S. patent application Ser. No. 61/426,448 entitled "THREE-DIMENSIONAL TRACKING OF OBJECTS IN A 3-D SCENE" filed Dec. 22, 2010, U.S. Patent Application Ser. No. 13/019,384 entitled "MODIFYING PERSPECTIVE OF STEREOSCOPIC IMAGES BASED ON CHANGES IN USER VIEWPOINT" filed Feb. 2, 2011, U.S. patent application Ser. No. 61/426,451 entitled "COLLABORATION SHARED PRESENCE" filed Dec. 22, 2010, each of which are incorporated by reference herein.

Figure 1:
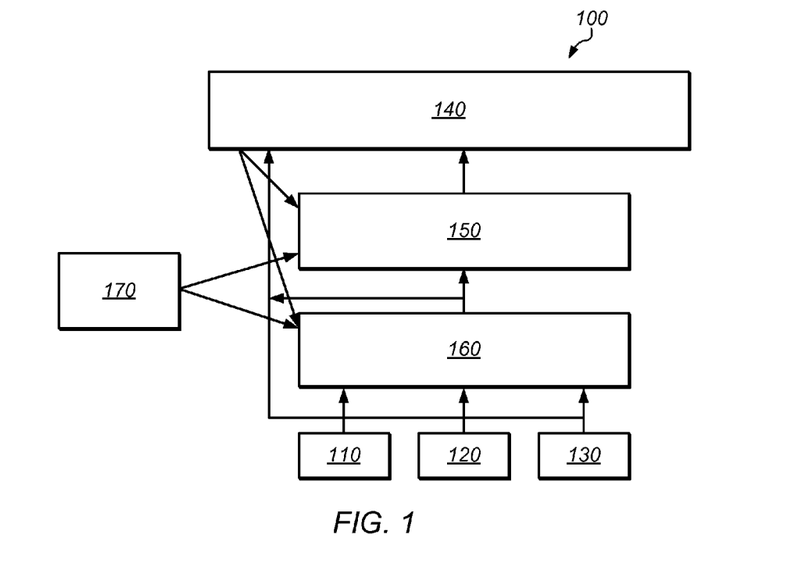
FIG. 1 depicts a diagram of an embodiment of a method for assessing handedness.

FIG. 1 depicts a diagram of a view of an embodiment of a method 100 for assessing handedness. As depicted in FIG. 1, following one channel, various input devices 110-130 may provide input to an application 140 which, in turn provides processed output to a device action mapping function 150 and a handedness detection function 160. Also input to these functions is output from a control panel 170. Following another channel, the handedness detection function 160 outputs to the device action mapping function 150 which, in turn, outputs to the application 140.

In some embodiments, a system and/or method may include tracking and/or refining the assessed handedness of the user over time. Doing so can be used to validate/verify that the system has correctly determined user handedness. This is, in part, accomplished by eliminating the "corner cases" in which the user's hand temporarily adopts an unusual position which might introduce error into handedness assessment. By gathering more data one is able to eliminate outlying anomalies.

In some embodiments, a system and/or method may include assessing a change of user based upon the assessed handedness of the user. If the system assesses that the hand usage of the user changes after a period of time, it may be concluded with a greater degree of certainty that a different user has taken control of the application. This may be beneficial in that the system is more able to quickly adapt to a new user, for example, in that data collected prior to a change in users may not be applied to the new user in assessing handedness of the new user. The system may be able to recall saved changes to the UI for previous users for example.

In some embodiments, a system may include an input device which may be tracked in space with 6 DOF position and orientation. For example, when the user manipulates the input device, the orientation of the input device with respect to the region it designates on the display screen allows a calculation that can assess, to a high degree of certainty, the handedness of the user. In some embodiments, assessing the handedness of the user using the position of the input device comprises assuming the input device comprises a dominant hand. In some embodiments, the method may include use of a threshold in the relationship between the position designated by the input device—or the position of the "laser beam" projected from the tip of the input device—and the virtual object or the UI item in 3D space. Designation to within such a threshold distance determines the selection of the virtual object and enables an identification of user handedness. The threshold value may vary depending upon the application.

Figure 2:
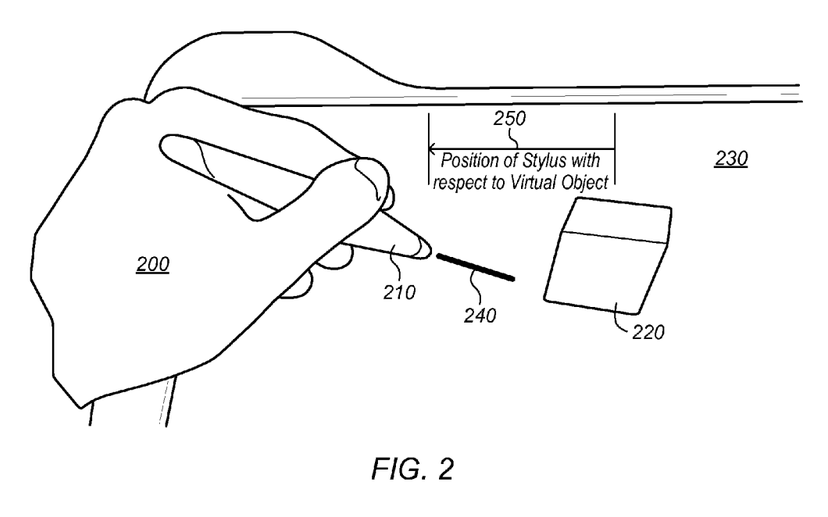
FIG. 2 depicts a diagram of an embodiment of a method for assessing a handedness of a left handed user by tracking a relationship of a stylus relative to a 3D object.

By measuring the orientation and position of the input device (e.g., stylus) with respect to the region on the display screen, one may assess which hand is used to hold the stylus. For example, if the orientation points to the right with respect to screen, it is very likely that the user is holding the stylus with the left hand. FIG. 2 depicts a diagram of an embodiment of a method for assessing a handedness of a left handed user 200 by tracking a relationship of a stylus 210 relative to a 3D object 220. 3D object 220 is projected by a display 230. In the embodiment depicted in FIG. 2 stylus 210 includes a rendered virtual laser beam 240 which facilitates selecting 3D object 220. Arrow 250 in FIG. 2 represents a position of the stylus relative to the 3D object.

Figure 3:
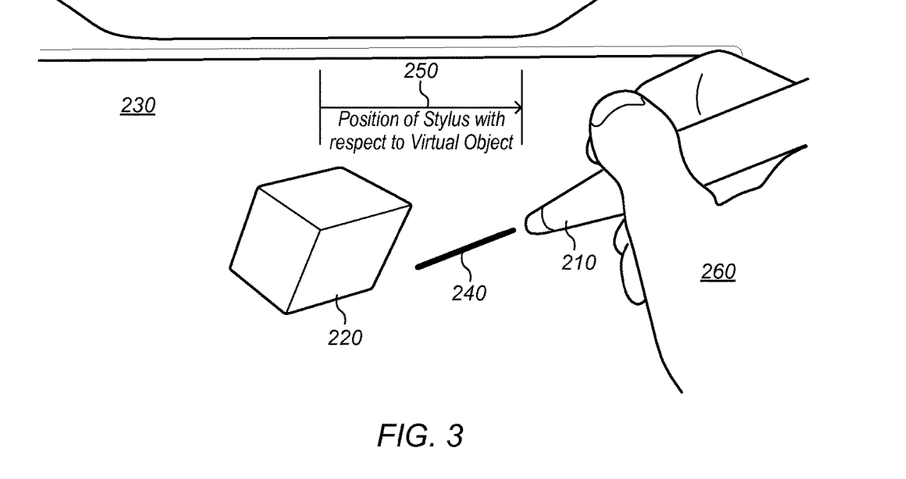
FIG. 3 depicts a diagram of an embodiment a method for assessing a handedness of a right handed user by tracking a relationship of a stylus relative to a 3D object.

For example, if the orientation and position of the tracked stylus points toward the left with respect to the screen, then it may be assessed that the user is holding the stylus using the right hand. FIG. 3 depicts a diagram of an embodiment a method for assessing a handedness of a right handed user 260 by tracking a relationship of stylus 210 relative to 3D object 220.

Figure 4:
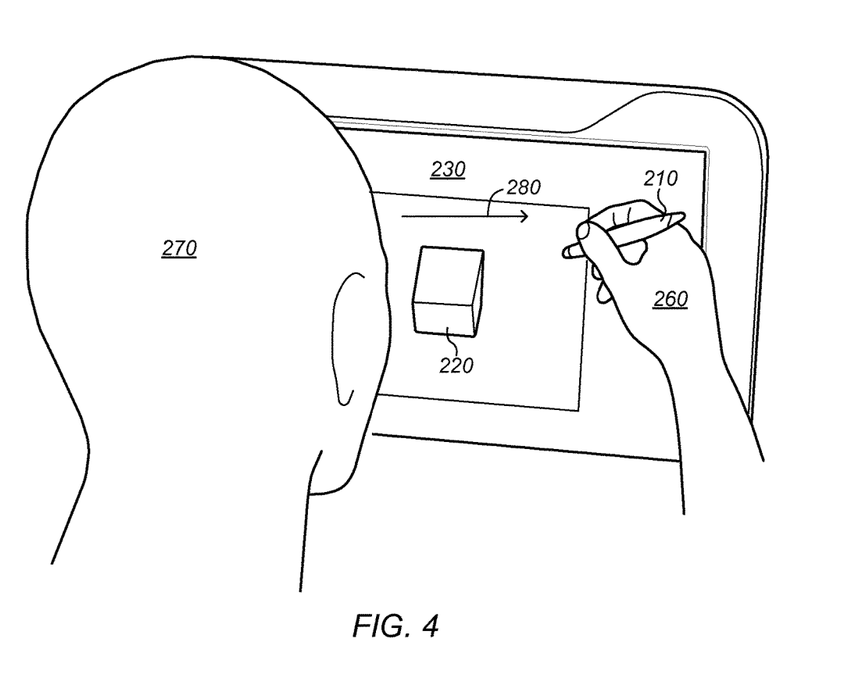
FIG. 4 depicts a diagram of an embodiment a method for assessing a handedness of a right handed user by tracking a relationship of a stylus relative to the user's head.
Figure 5:
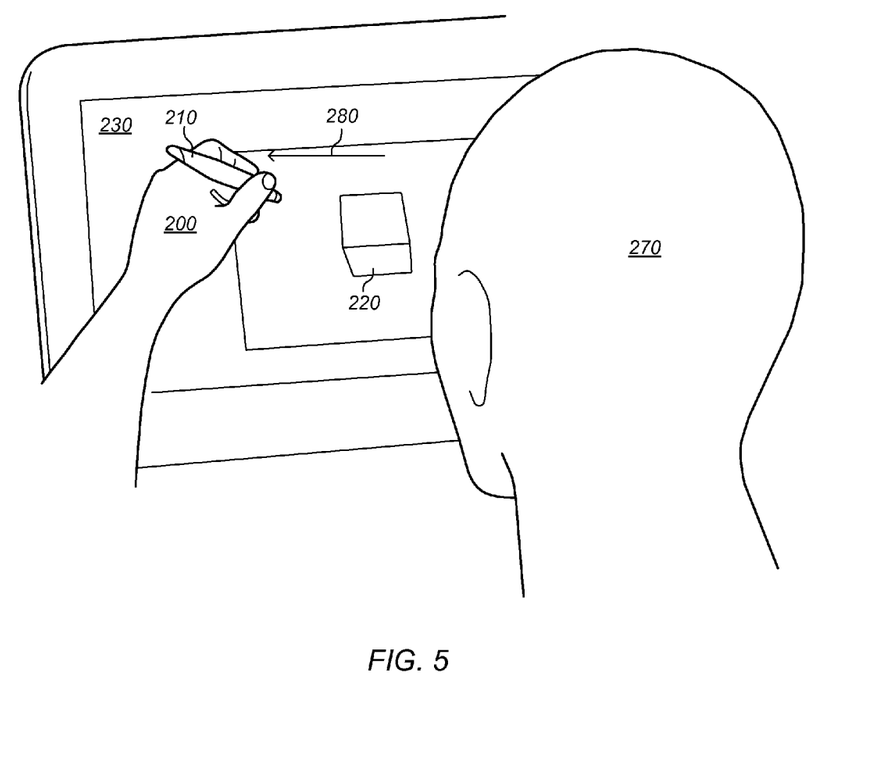
FIG. 5 depicts a diagram of an embodiment a method for assessing a handedness of a left handed user by tracking a relationship of a stylus relative to the user's head.
Figure 6:
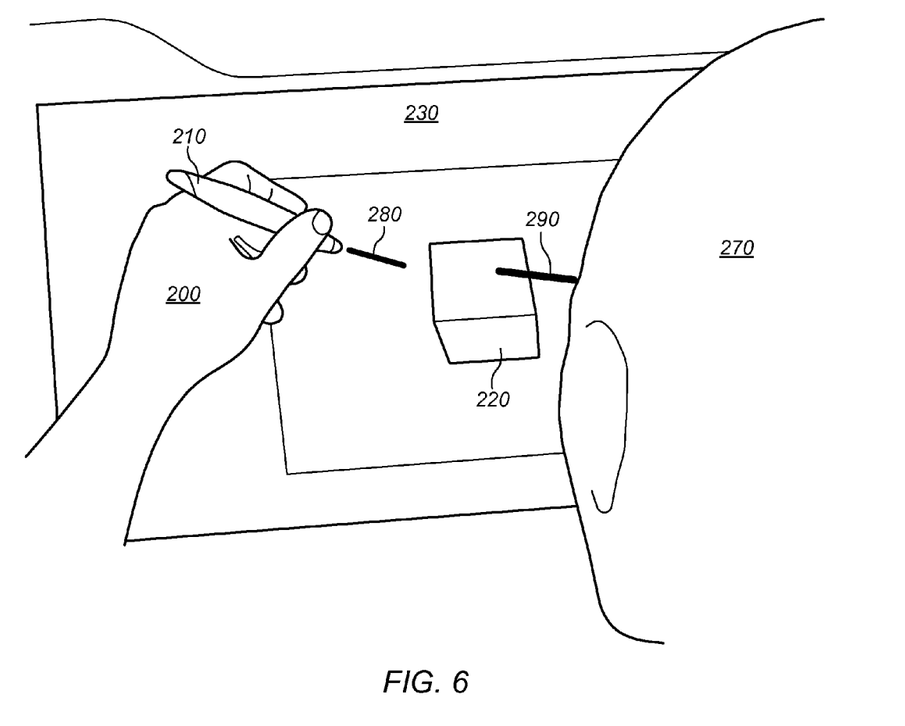
FIG. 6 depicts a diagram of an embodiment a method for assessing a handedness of a user by tracking a relationship of a stylus relative to the user's head position and orientation.

In some embodiments, a system and/or method may include tracking a position and an orientation of a second input device. Assessing the handedness of the user using the position of the input device may include using the position of the input device relative to the position of the head of the user and to the position of the second input device of the user. In some embodiments, the second input device may include a non-dominant hand of the user or a head of a user as depicted in FIGS. 4-6.

It should be noted that the way in which a user holds an object (e.g., stylus) may be dependent upon where he is holding the stylus in relation to their body. In some embodiments, a method assumes the user is sitting approximately in front of a display. If the 3D virtual object is in the center of the viewing volume, a center heuristic applies such that a left-handed stylus most likely is to the left of the virtual object, while a right handed stylus is physically located to the right of the virtual object. However, it does not matter if the object in not in the center of the display. Regardless of where the object is, the position combined with orientation of the pointing device gives a strong suggestion of which hand is being used. In some embodiments, a heuristic may include: a) if object is within the center ~60% of screen, the "center" heuristic applies; b) if object is in the left ~20% of screen, it's likely that the left hand will align in x-direction with the object, and its orientation remains slightly pointing to the right. A right hand will remain on the right side of the screen while its orientation will twist even more toward the left; and c) if object is in the right ~20% of screen, it's likely the right hand will align with the x-direction. A left hand will most likely remain to the left of the object while the orientation twists more to the right. In this embodiment a stylus should not be seen as a limiting example and other input device may be used (e.g., a pen, knife, pointer, or other physical device whose position and/or orientation are tracked by the system).

Herein input device may be used at times in a more generic sense. In that an input device may include things other than a piece(s) of physical hardware (e.g., a stylus, glasses (used with 3D display), 3D mouse etc.). Handedness may be assessed by tracking a position and/or relative position of items besides pieces of physical hardware. For example body parts of a user may be tracked (e.g., hands, fingers, head, torso position, arms, legs, user gaze (eye tracking) etc.).

Programs and applications (especially games) are known to call for the user to gesture by raising their hand. The system may determine the position of the user's hand with respect to the user's head. Gesture recognition may determine that the hand is, for example, palm towards the screen. Assuming that the dominant hand is used for such a gesture, the handedness of the user may be identified. For example, a skeletal model of a hand may accurately distinguish the thumb from the other 4 fingers based on human physiology. It may be assumed that the user raises the hand with palm facing screen (e.g., naturally and painless) rather than palm away from screen (e.g., more strain on wrist). Under that assumption, one may determine which hand (left or right) fits the skeletal model.

In some embodiments, a system and/or method may include tracking a position and an orientation of a head of the user. Assessing the handedness of the user using the position and the orientation information of the input device may include using the position and the orientation of the input device relative to the position and the orientation of the head of the user (e.g., based upon whether the input device is positioned left or right of the head). The method may include tracking the 6-DOF position and orientation of the user's head (e.g., using glasses, eyes, face, etc.). The user's head position and/or orientation may be used in conjunction with the position and orientation of the user input device (e.g., stylus) to determine handedness. Typically, the user's head position remains approximately in the center, between the left hand and right hand. Therefore, by combining the user head position and the position of the user input device, it may be determined which hand is used to hold the input device. FIG. 4 depicts a diagram of an embodiment a method for assessing a handedness of a right handed user 260 by tracking a relationship (arrow 280) of a stylus 210 relative to the user's head 270. FIG. 5 depicts a diagram of an embodiment a method for assessing a handedness of a left handed user 200 by tracking a relationship (arrow 280) of a stylus 210 relative to the user's head 270.

In some embodiment, the position of a user's head may facilitate assessment of a user's handedness. In some embodiments, the orientation of the head may be combined with the position of the head to further deduce handedness. The orientation of the head typically is directed toward the virtual object being manipulated in 3D space. One may construct a virtual vector extending from user head orientation and position and find its intersection with the virtual vector extending from user input device. The volume of intersection in 3D space may indicate the position of the virtual object being manipulated.

By comparing the location of the virtual object (intersection of virtual vectors) with the position and orientation of the stylus, one may assess the hand that is holding the stylus and infer the user handedness, (e.g., as depicted in FIG. 6). FIG. 6 depicts a diagram of an embodiment a method for assessing a handedness of a user 200 by tracking a relationship of a stylus 210 relative to the user's head 270 position and orientation. The system and/or method compares a virtual vector 280 (representing position and orientation) extending from stylus 210 to a virtual vector 290 (representing position and orientation) extending from user's head 270.

In some embodiments, when head/gaze tracking capability is added to the computer, the system may automatically move a menu or other relevant UI elements to where the user is looking.

Figure 7:
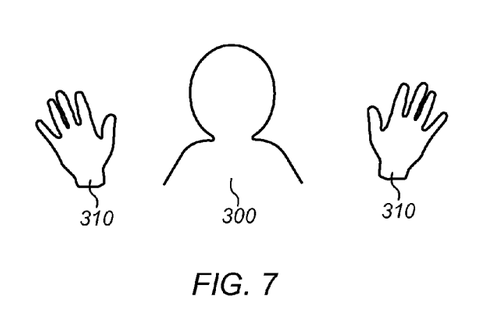
FIG. 7 depicts a diagram of an embodiment a method for assessing a handedness of a user by tracking a relationship of the user's arm and/or torso relative to the user's finger/hand/user input device.

In some embodiments, it is possible to use the user's body position/orientation with respect to the object in 3D space that is being manipulated to assess the user's handedness. The system may use body position and orientation (including forearm, torso, etc.). By combining the position of the arm/torso with the position and motion of the fingers/hand/user input device, the system may assess which hand is being used for the gestures or input device. FIG. 7 depicts a diagram of an embodiment a method for assessing a handedness of a user by tracking a relationship of the user's arm and/or torso 300 relative to the user's finger/hand/user input device 310.

Systems which track movements of body parts of a user may be referred to as having gesture recognition capabilities. This would be true for hand gesturing as well, where the user may be using free hand motions to control aspects of the scene. The assumption being that the more capable, dominant hand would be used for either function.

If the user executes a multi-finger swipe motion to move or rotate an object, hand recognition may be used to identify the hand used to do so. For example, if the user executes a two fingered "pinch" touch screen event to shrink or enlarge an object, hand recognition may be used to identify the hand used to do so. The assumption being that the more capable, dominant hand would be used for this function.

Figure 8A:
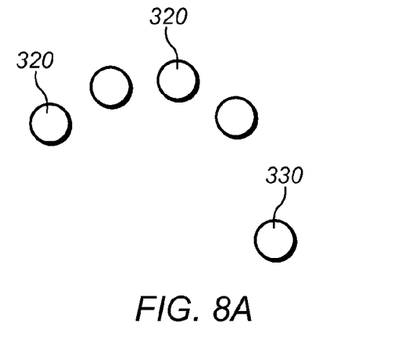
FIGS. 8A-D depict a diagram of an embodiment a method for assessing a handedness of a user by tracking a relationship of the user's fingertips and/or the relative motion of the user's fingertips.
Figure 8B:
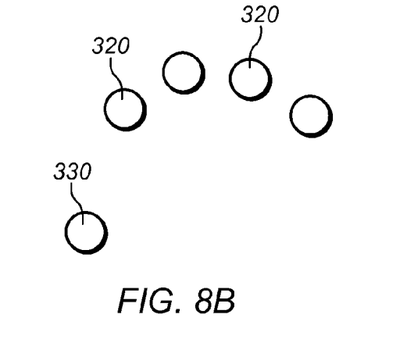

In some embodiments, a method and/or system may be able to detect hand and finger position and orientation. By tracking over time the position and motion of the fingers/hand, the system may assess which hand is being used for the gestures. For example, with 5 detected finger tips, the relative positions may assess which hand is used. FIGS. 8A-B depict a diagram of an embodiment a method for assessing a handedness of a user by tracking a relationship of the user's fingertips 320. For example, the detected spatial relative relationship between fingertips 320 and thumb 330 may allow a system to assess that the user in FIG. 8A is left handed and the user in FIG. 8B is right handed.

Figure 8C:
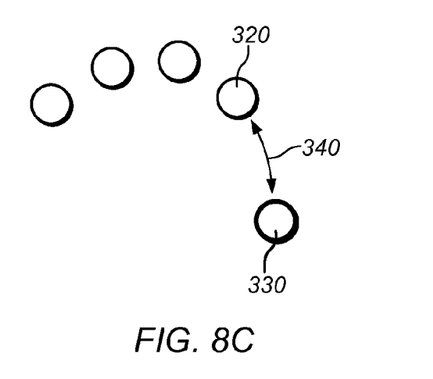
Figure 8D:
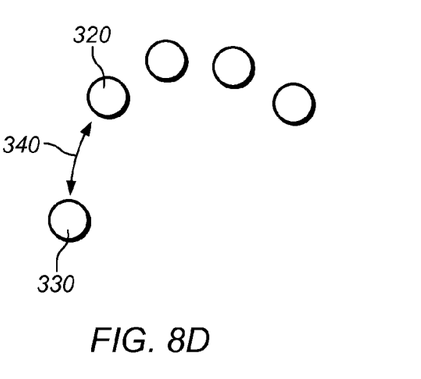

In some embodiments, relative motion in 3D volume of fingertips may imply handedness. FIGS. 8C-D depict a diagram of an embodiment a method for assessing a handedness of a user by tracking the relative motion 340 of the user's fingertips 320. For example, the detected relative motion between fingertip 320 and thumb 330 may allow a system to assess that the user in FIG. 8A is left handed and the user in FIG. 8B is right handed. In some embodiments, gesture tracking may be obtained by an off the shelf tool (e.g., Intel's perceptual computing, Leap's SDK, etc.). In some embodiments, a method includes using gesture recognition to assess and/or further refine the dominant hand by assessing the hand that undertakes the more detailed manipulation of 3D objects or the UI.

Figure 9:
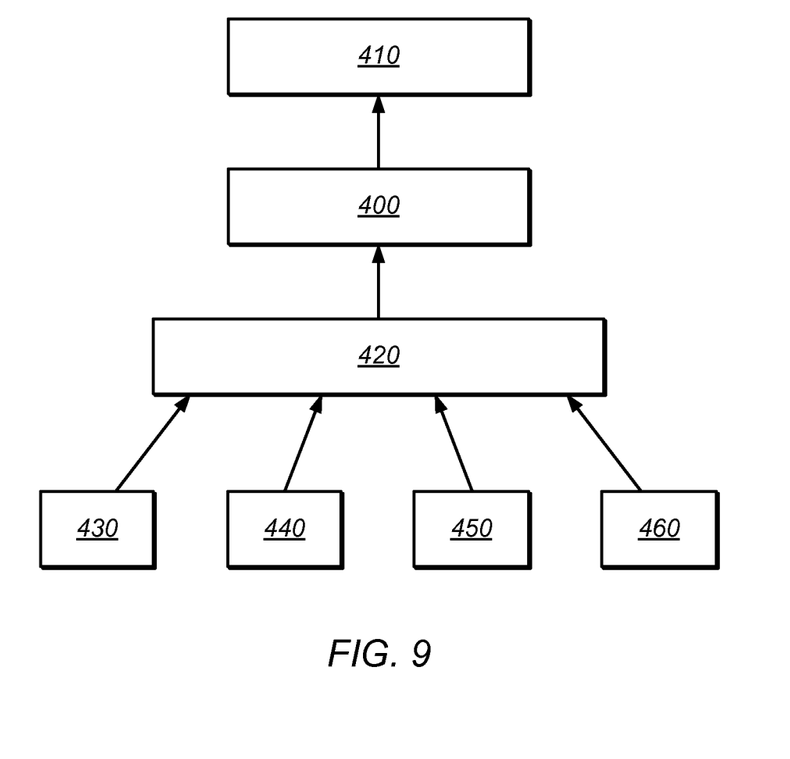
FIG. 9 depicts a diagram of an embodiment of a method of mapping a user interface based upon an assessed handedness of a user.

Having determined the handedness of the user, the functionality of the input devices may be optimized. In some embodiments, the method may include configuring at least a portion of the 3D image (e.g., UI) based upon the assessed handedness. The at least a portion of the 3D image may include interactive menus of the UI. Configuring a UI based on assessed handedness may be referred to as mapping. FIG. 9 depicts a diagram of an embodiment of a method of mapping 400 a user interface 410 based upon an assessed handedness 420 of a user. Input devices 430, 440, 450, and 460 (e.g., depicted in FIG. 9) may include a stylus, a mouse, a trackball, and/or human gestures. Adjustments to the configuration of the UI may include locations of the on-screen tools, palettes, inspectors, application control bars, main menus, toolbars, contextual menus and pop-up menus.

Knowing the hand position, the position of the 3D virtual object and the user view direction may allow an assessment of where a menu should go so the view is not blocked by the position of the user. For example, the left hand, holding a stylus may reach to the right to manipulate a virtual 3D object. In doing so, the arm blocks a menu that is positioned behind the arm. If, based on this information, the system determines that a menu is blocked, it may be "brought forward" into a transparent screen in front of the virtual objects in 3D space or moved to the side where the menu is not blocked. The menu may be moved to either side such that the menu is not blocked by any portion of the user. In another embodiment, the transparent screen may be configured like a HUD with its location fixed with respect to the user's view direction.

In some embodiments, a user may become habituated to finding certain UI information and functions located at a certain place in 3D space. Moving the location of such items may be distracting. It may be therefore needed for some aspects of the UI to specifically not change based on the handedness of the user. In some embodiments, such static UI elements may be preprogrammed into the system. In some embodiments, certain UI elements may be automatically assessed by the system based upon user history. For example if a user consistently moving a UI element to a particular area of the display especially after it is automatically moved by the system then the system may learn over time that the UI element should not be moved. The user may have the option to define the UI element as static such that the UI element is not moved by the system.

In some embodiments, the method may include configuring at least a portion of an interactive hardware or input devices associated with the system based upon the assessed handedness. Adjustments to the configuration of input devices may include adjusting, for example, a mouse (e.g., a two-button mouse). For example, the functions of the left and right buttons may invert in response to the handedness of the user. The functions assigned to the mouse may be those that require precise spatial control if used in the dominant hand. Conversely, the functions assigned to the mouse may be those requiring little spatial control if the mouse is being used by the non-dominant hand. More generally, a list can be created of uses for input devices when they are in and used by the dominant hand of the user and when they are in and used by the non-dominant hand of the user. That is, the assignment of functions to the input device may be made based on which of the user's hands is controlling the input device based both on if it is the user's dominant or non-dominant and if it is the user's left or right hand.

In some embodiments, given that the system has assessed the function of the dominant hand, the system may offer suggestions regarding what to do with the non-dominant hand. In some embodiments, given that the system has assessed the function of the dominant hand, the system brings an appropriate tool to the non-dominant hand. Example: the determined dominant hand holds a scalpel. The system assesses what the user is doing (e.g., based upon user input) and, at an appropriate time, makes available a suction device to the non-dominant hand. A related idea is to include in the UI, appropriately located pallets with appropriate tools for the non-dominant hand based on the function of the dominant hand.

Both reconfiguring the UI and the input devices lead to a better user experience over all. A better user experience in many respects sums up the goal of the embodiments described herein. Related to this concept is how reconfiguring the UI and the input devices automatically may increase user efficiency and productivity.

EXAMPLES

Example 1: wherein the user's left hand reaches through a 3D object in the process of moving the object to the right. In this example, the menu is placed on the left side of the 3D volume such that the menu is not blocked by the user's left hand.

Figure 10:
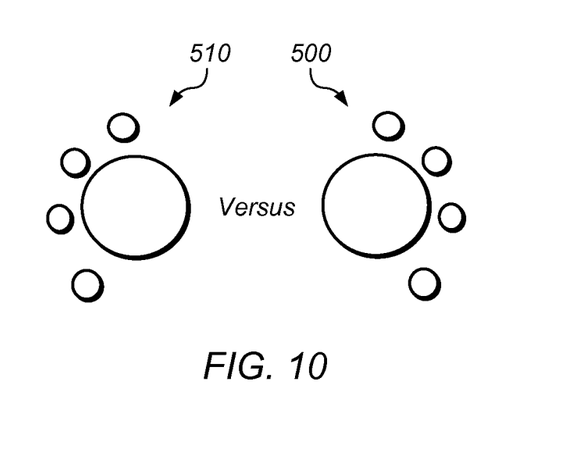
FIG. 10 depicts a diagram of an embodiment of two radial contextual menus for a right handed and a left handed menu.

Example 2: expansion or growth direction of radial contextual menus. FIG. 10 depicts a diagram of an embodiment of two radial contextual menus for a right handed 500 and a left handed 510 menu. The radial contextual menus are reversed for a more efficient and better user experience for a right or left handed user.

Example 3: consider a system that includes a stylus, gesture recognition and head/eye tracking capability. Knowing the hand position, the position of the 3D virtual object and the user view direction may allow a determination of where a menu should go so the view is not blocked by the position of the user. For example, the left hand, holding a stylus may reach to the right to manipulate a virtual 3D object. In doing so, the arm blocks a menu that is positioned behind the arm. If, based on this information, the system determines that a menu is blocked, it may be "brought forward" into a transparent screen in front of the virtual objects in 3D space. In another embodiment, the transparent screen may be configured like a HUD with its location fixed with respect to the user's view direction.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An automated method for assessing handedness of a user of a system, comprising:
   displaying a three dimensional (3D) stereoscopic image on a display, wherein the 3D stereoscopic image comprises at least one projected 3D object;
   tracking a position and orientation of an input device in open space in relation to the at least one projected 3D object of the 3D stereoscopic image;
   tracking a position and orientation of a head of the user;
   assessing a handedness of a user based on the position and orientation of the input device with respect to the at least one projected 3D object and relative to the position and orientation of the head of the user, wherein assessing the handedness comprises determining a dominant hand and a non-dominant hand of the user; and
   wherein when the user input device is in the dominant hand of the user, the method further comprises:
      assigning a first one or more functions to the input device, wherein the first one or more functions require precise spatial control; and
      receiving user input selecting a first function of the first one or more functions, wherein when the first function is a scalpel tool, the method further comprises:
         making available to the non-dominant hand of the user a second function of a second one or more functions, wherein the second one or more functions require little spatial control, wherein the second function is complementary to the first function, and wherein the second function is a suction tool; and
   wherein when the user input device is in the non-dominant hand of the user, the method further comprises assigning the second one or more functions to the input device.

2. The method of claim 1, further comprising refining the assessed handedness of the user over time.

3. The method of claim 1, wherein the input device comprises a handheld input device.

4. The method of claim 1, further comprising refining the assessed handedness of the user by assessing a hand of the user that over a period of time executes a majority of fine manipulations requiring precise spatial control.

5. The method of claim 1, further comprising assessing a change of user based upon the assessed handedness of the user.

6. The method of claim 1, further comprising configuring at least a portion of the 3D stereoscopic image and/or associated hardware based upon the assessed handedness of the user.

7. The method of claim 6, wherein said configuring comprises repositioning one or more projected 3D objects in the 3D stereoscopic image and/or changing one or more functions associated with one or more portions of the associated hardware.

8. The method of claim 1, further comprising configuring at least a portion of the 3D stereoscopic image based upon the assessed handedness.

9. The method of claim 1, further comprising configuring at least a portion of the 3D stereoscopic image based upon the assessed handedness, wherein the at least a portion of the 3D stereoscopic image comprises interactive menus.

10. The method of claim 1, further comprising configuring at least a portion of an interactive hardware associated with the system based upon the assessed handedness.

11. A non-transitory computer accessible memory medium storing program instructions for automatically assessing handedness of a user of a system, wherein the program instructions are executable by a processor to:
   display a three dimensional (3D) stereoscopic image on a display, wherein the 3D stereoscopic image comprises as least one projected 3D object;

track a position and orientation of an input device in open space in relation to the at least one projected 3D object of the 3D stereoscopic image;

track a position and orientation of a head of the user; and assess a handedness of a user based on the position and orientation of the input device with respect to the least one projected 3D object and relative to the position and orientation of the head of the user, wherein to assess the handedness of the user, the program instructions are further executable to determine a dominant hand and a non-dominant hand of the user; and wherein when the user input device is in the dominant hand of the user, the program instructions are further executable to:

assign a first one or more functions to the input device, wherein the first one or more functions require precise spatial control; and receive user input selecting a first function of the first one or more functions, wherein when the first function is a scalpel tool, the program instructions are further executable to:

make available to the non-dominant hand of the user a second function of a second one or more functions, wherein the second one or more functions require little spatial control, wherein the second function is complementary to the first function, and wherein the second function is a suction tool; and wherein when the user input device is in the non-dominant hand of the user, the program instructions are further executable to assign the second one or more functions to the input device.

12. The non-transitory computer accessible memory medium of claim 11, wherein the program instructions are further executable by the processor to:

configure at least a portion of the 3D stereoscopic image based upon the assessed handedness.

13. The non-transitory computer accessible memory medium of claim 11, wherein the program instructions are further executable by the processor to:

configure at least a portion of the 3D stereoscopic image based upon the assessed handedness, wherein the at least a portion of the 3D stereoscopic image comprises interactive menus.

14. The non-transitory computer accessible memory medium of claim 11, wherein the program instructions are further executable by the processor to:

configure at least a portion of an interactive hardware associated with the system based upon the assessed handedness.

15. A system for automatically assessing handedness of a user of a system, comprising:

a processor;

a display coupled to the processor, wherein the display is configured to display a three dimensional (3D) stereoscopic image, and wherein the 3D stereoscopic image comprises as least one 3D object; and a memory medium coupled to the processor which stores program instructions executable by the processor to:

track a position and orientation of a position input device in open space in relation to the at least one 3D projected object of the 3D stereoscopic image;

track a position and orientation of a head of the user;

assess a handedness of a user based on the position and orientation of the input device with respect to the at least projected one 3D object and relative to the position and orientation of the head of the user, wherein to assess the handedness of the user, the program instructions are further executable to determine a dominant hand and a non-dominant hand of the user; and wherein when the user input device is in the dominant hand of the user, the program instructions are further executable to:

assign a first one or more functions to the input device, wherein the first one or more functions require precise spatial control; and receive user input selecting a first function of the first one or more functions, wherein when the first function is a scalpel tool, the program instructions are further executable to:

make available to the non-dominant hand of the user a second function of a second one or more functions, wherein the second one or more functions require little spatial control, wherein the second function is complementary to the first function, and wherein the second function is a suction tool; and wherein when the user input device is in the non-dominant hand of the user, the program instructions are further executable to assign the second one or more functions to the input device.

16. The system of claim 15, wherein the program instructions are further executable by the processor to:

configure at least a portion of the 3D stereoscopic image based upon the assessed handedness.

17. The system of claim 15, wherein the program instructions are further executable by the processor to:

configure at least a portion of the 3D stereoscopic image based upon the assessed handedness, wherein the at least a portion of the 3D stereoscopic image comprises interactive menus.

18. The system of claim 15, wherein the program instructions are further executable by the processor to:

configure at least a portion of an interactive hardware associated with the system based upon the assessed handedness.

19. The non-transitory computer accessible memory medium of claim 11, wherein the program instructions are further executable by the processor to:

track a position and orientation of a second input device, wherein assessing the handedness of the user using the position and orientation of the input device comprises using the position and orientation of the input device relative to the position and orientation of the head of the user and to the position and orientation of the second input device of the user.

20. The non-transitory computer accessible memory medium of claim 11, wherein the program instructions are further executable by the processor to:

refine the assessed handedness of the user by assessing a hand of the user that over a period of time executes a majority of fine manipulations requiring precise spatial control.

21. The non-transitory computer accessible memory medium of claim 11, wherein the program instructions are further executable by the processor to:

assess a change of user based upon the assessed handedness of the user.

22. The method of claim 1, wherein when the user input device is in the dominant hand of the user, the method further comprises assigning a first configuration to the user input device based on the user input device being in the dominant hand; and wherein when the user input device is in the non-dominant hand of the user, the method further comprises assigning a second configuration to the user input device based on the user input device being in the non-dominant hand of the user.

23. The non-transitory computer accessible memory medium of claim 11, wherein when the user input device is in the dominant hand of the user, the program instructions are further executable to assign a first configuration to the user input device based on the user input device being in the dominant hand; and wherein when the user input device is in the non-dominant hand of the user, the program instructions are further executable to assign a second configuration to the user input device based on the user input device being in the non-dominant hand of the user.

24. The method of claim 1, further comprising tracking a position and orientation of a second input device, wherein assessing the handedness of the user using the position and orientation of the input device comprises using the position and orientation of the input device relative to the position and orientation of the head of the user and to the position and orientation of the second input device of the user.

25. The system of claim 15, wherein the program instructions are further executable by the processor to:

track a position and orientation of a second input device, wherein assessing the handedness of the user using the position and orientation of the input device comprises using the position and orientation of the input device relative to the position and orientation of the head of the user and to the position and orientation of the second input device of the user.

26. The system of claim 15, wherein the program instructions are further executable by the processor to:

wherein when the user input device is in the dominant hand of the user, the program instructions are further executable to assign a first configuration to the user input device based on the user input device being in the dominant hand; and wherein when the user input device is in the non-dominant hand of the user, the program instructions are further executable to assign a second configuration to the user input device based on the user input device being in the non-dominant hand of the user.

* * * * *